United States Patent [19]

Ozawa

[11] Patent Number: 4,967,709
[45] Date of Patent: Nov. 6, 1990

[54] IGNITION TIMING CONTROL DEVICE FOR AN INTERNAL COMBUSTION ENGINE

[75] Inventor: Masayuki Ozawa, Himeji, Japan

[73] Assignee: Mitsubishi Denki Kabushiki Kaisha, Tokyo, Japan

[21] Appl. No.: 416,579

[22] Filed: Oct. 3, 1989

[30] Foreign Application Priority Data

Oct. 4, 1988 [JP] Japan .................. 63-249071

[51] Int. Cl.$^5$ ................................ F02P 5/15
[52] U.S. Cl. ............................. 123/418; 123/417
[58] Field of Search ................ 123/416, 417, 418, 419

[56] References Cited

U.S. PATENT DOCUMENTS

| 4,220,125 | 9/1980 | Nishida et al. | 123/416 |
| 4,377,996 | 3/1983 | Yamaguchi | 123/417 |
| 4,426,974 | 1/1984 | Nash | 123/418 |
| 4,554,900 | 11/1985 | Komoda | 123/418 |

FOREIGN PATENT DOCUMENTS

| 0075963 | 6/1981 | Japan | 123/416 |
| 173562 | 10/1984 | Japan . | |
| 187765 | 9/1985 | Japan . | |

Primary Examiner—Tony M. Argenbright
Assistant Examiner—Robert E. Mates
Attorney, Agent, or Firm—Sughrue, Mion, Zinn, Macpeak and Seas

[57] ABSTRACT

An ignition timing control device for an internal combustion engine is provided with a microcomputer which determines the ignition timing (i.e., the angles BTDC) on the basis of a measurement of the period between successive pulses of a crankshaft angle signal in each ignition cycle. The device comprises, in addition to other conventional components, an rpm level judgement device, for determining whether the rpm of the engine is above a predetermined level or not. At the start of each ignition control cycle, this determination of the rpm level is effected on the basis of the measurement of the period of the crankshaft angle signal performed in the immediately preceding ignition cycle. When the rpm is judged to be above the predetermined level, the ignition timing signal is generated in accordance with the value of the ignition timing which has been determined in the preceding ignition cycle; when, on the other hand, the rpm is judged to be not above the predetermined level, the ignition timing signal is generated in accordance with the value of the ignition timing which is determined in the current ignition cycle.

3 Claims, 4 Drawing Sheets

IGNITION TIMING CONTROL DEVICE FOR AN INTERNAL COMBUSTION ENGINE

BACKGROUND OF THE INVENTION

This invention relates to ignition devices for internal combustion engines, and more particularly to ignition timing control devices thereof comprising a microcomputer which is capable of adjusting the ignition timing to the optimum angle in accordance with the rpm of the engine.

Recently, it is becoming increasingly common in the automotive industry to utilize a microcomputer in the control of the ignition timing of an internal combustion engine. FIG. 1 shows a typical organization of such an ignition timing control device utilizing a microcomputer. A signal generator 1 comprises a rotor 1a and a pickup coil 1b; the rotor 1a, coupled to the crankshaft of the internal combustion engine to be rotated therewith, has a pattern of notches or projections (not shown in the figure) formed at the circumference thereof, so that the coil 1b generates a signal Sp consisting of a pattern of pulses which is repeated in each rotation of the crankshaft. The angular signal Sp from the signal generator 1 is inputted via an input circuit 2 to the microcomputer. The microcomputer itself comprises the following: CPU (central processing unit) 3 consisting of a microprocessor, an input timer 4 coupled to the input circuit 2, an output timer 5 coupled to the output circuit 11, an input port 6 which is coupled to various kinds of input circuits (not shown), a timer 7 within the microcomputer, a ROM (read-only memory) 8 in which various kinds of predetermined operation programs and data tables are stored, and a RAM (random access memory) 9 in which various kinds of temporary input and output data are stored; the above parts 3 through 9 of the microcomputer are coupled to each other by means of a bus 10. The output circuit 11 coupled to the output timer 5 consists of power transistors, etc., for turning on and off the current supplied to the ignition coil 12. The ignition coil 12 comprises a primary side coil 12a coupled to the output circuit 11, and a secondary side coil 12b across which ignition plugs (not shown) of the internal combustion engine are coupled. The current supplied to the primary side coil 12a is turned on and off by the output circuit 11 so as to induce a high voltage across the secondary side coil 12b, and hence across the gap of the ignition plugs.

The control of the ignition timing by means of the microcomputer of FIG. 1 is usually effected by means of a routine such as that shown in FIG. 2. In each ignition cycle, &he routine of FIG. 2 is initiated by the CPU 3 when an input signal interrupt is generated. Then, at step S3, the interval of time or period between successive pulses of the signal Sp, received from the signal generator 1 via the input circuit 2, is measured by the input timer 4; further, the ignition timing or the ignition angle before top dead center (BTDC) is determined on the basis of the period of the signal Sp which has just been measured; this determination of the ignition timing is effected by referring to a table stored in the ROM 8. The ignition timing thus determined is stored in the RAM 9. Next, at step S5, the CPU 3 effects an ignition timing prediction process on the basis of the current data, e.g., the ignition timing stored in the RAM 9. The routine thus ends at step S6. The ignition timing signal generated on the basis of this ignition timing prediction process is supplied to the output circuit 11; in response thereto, the output circuit 11 turns off the current supplied to the primary side coil 12a to induce a high voltage across the secondary side 12b at the precise point of time indicated by the ignition timing signal, thereby producing a spark across the gap of an ignition plug of the engine.

FIG. 3 shows the relation between the rpm of the engine (plotted along the abscissa) and the ignition timing (plotted along the ordinate). The ignition timing, as represented by degrees BTDC (before top dead center), is advanced as shown schematically by the solid curve A. (The relation such as that shown by the curve A is stored in the ROM 8 in the form of a table.) The intervals between the pulses of the signal Sp, as measured in angular degrees, are fixed according to the pattern of notches or projections formed on the circumference of the rotor 1a of the signal generator 1; thus, the intervals of time between the same pulses decrease as the rpm of the engine increases. Consequently, the intervals of time between the reference pulse shown near the bottom of Sp in FIG. 3 and the two pulses of Sp at the advance side near the top thereof become increasingly smaller as the rpm of the engine increases, as shown by the two dot-and-dash lines.

Thus, the above ignition timing control device has the following disadvantage: Let us assume that the interval of time or period between the two advance side pulses of Sp shown near the top in FIG. 3 is utilized in calculating the rpm of the engine and in determining the ignition timing at step S3 in FIG. 2. Then, in the high rpm region where the strip domain between the two dot-and-dash lines, which strip roughly corresponds to the ignition timing calculation time, comes near to the ignition timing, the proper ignition timing (represented schematically by the curve A) is lost before the determination of the period between the two advance side pulses of Sp and hence the calculation of the ignition timing based thereon (which are performed at step S3 in FIG. 2) are completed. Consequently, the angular interval between the reference pulse (shown near the bottom in FIG. 3) and the advance side pulses (shown near the top) of the signal Sp must be made sufficiently great to ensure that the calculation time remains even if the rpm of the engine increases to or near its maximum. Consequently, the interval of time between the time at which the calculation of the ignition timing is effected and the time at which the ignition is actually effected becomes longer in the low rpm region. If the rotational speed of the engine varies during this interval of time between calculation and ignition, a deviation of the ignition timing from the optimum angle may result. That is, varying rotational speed of the engine may result in undesirable deviations of the ignition timing.

SUMMARY OF THE INVENTION

It is a primary obJect of this invention therefore to provide an ignition timing control device for an internal combustion engine utilizing a microcomputer which is capable of adjusting the ignition timing to the optimum angle in accordance with the rpm of the engine even in the presence of fluctuating variations in the rpm.

A more particular object of this invention is to provide such an ignition timing control device in which the following two apparently contradictory requirements are fulfilled: (a) the interval of time between the time at which the predictive calculation of the ignition timing is performed and the time at which the ignition is actually effected is sufficiently short even in the low rpm region to ensure an accurate prediction of the ignition timing; and (b) the same interval of time between the calculation of the ignition timing and the actual ignition is sufficiently long even in the high rpm region near or at the maximum rpm to ensure that the predictive ignition timing calculation process can be completed in due time.

The above objects are accomplished in accordance with the principles of this invention in an ignition timing control device which comprises, in addition to the angular signal generator for generating an angular signal consisting of a pattern of pulses corresponding to the rotation of the crankshaft of the engine, the following: (A) means for determining a rotational speed parameter corresponding to the period between the consecutive pulses of the angular signal of the angular signal generator; (B) means for determining the ignition timing (or the ignition angle before top dead center (BTDC)); (C) means for determining whether the rotational speed of the engine is above a predetermined level or not; and (D) means for generating an ignition timing signal. All these means (A) through (D) may be comprised by a microcomputer. Means (A) through (D) operate as follows according to this invention:

The rotational speed parameter determining means (A) is coupled to the angular signal generator and receives the pulses of the angular signal in each ignition cycle. Thus, means (A) calculates the rotational speed parameter in each ignition cycle on the basis of the pulses received in that ignition cycle. The ignition timing determining means (B) determines the ignition timing (or degrees BTDC) in each ignition cycle on the basis of the parameter determined on that ignition cycle. On the otehr hand, the rotaitonal speed level judgement means (C) effects the above rotational speed level judgement in each ignition cycle as follows: namely it compares to the predetermioned level the rotational speed corresponding to the rotational speed parameter that has been determined by means (A) in the immediately preceding ignition cycle; thus, means (C) can effect the speed level judgement before the above calculations of the rotational speed parameter and of the ignition timing by the means (A) and (B) are performed in the current ignition cycle. The ignition timing signal generator means (D) generates an ignition timing signal in accordance with the ignition timing determined by means (B) either in the current o the immediately preceding ignition cycle; the determination as to which value of the ignition timing is utilized is done in accordance with the result of the judgement of the rotational speed level judgement means (C); namely:

(1) In an ignition cycle in which the rotational speed is high and is determined to be above the predetermined level, means (D) generates the ignition timing signal in accordance with the value of the ignition timing that has been determined by means (B) in the immediately preceding ignition cycle; thus, when the rpm of the engine is high, the ignition timing signal can be generated by means (D) before the calculations of the rotational speed parameter and of the ignition timing by the means (A) and (B) in the current ignition cycle are performed.

(2) In an ignition cycle in which the rotational speed is low and is determined to be not above the predetermined level, means (D) generates the ignition timing signal in accordance with the value of the ignition timing that is determined by means (B) in the current ignition cycle; thus, when the rpm of the engine is low, the interval of time that passes between the calculation of the ignition timing and the actual ignition is rendered sufficiently short to ensure that the ignition is effected at the optimum angle.

The rotational speed parameter determined by means (A) may be the period between two consecutive pulses of the signal of the angular signal generator. In a preferred form, the device further comprises memory means in which respective values of the rotational speed parameter and of the ignition timing calculated or determined by means (A) and (B), respectively, are stored and updated in each ignition cycle; then, means (C) and means (D) may utilize the values stored in such memory means in their respective operations in each ignition cycle.

BRIEF DESCRIPTION OF THE DRAWINGS

The novel features which are believed to be characteristic of this invention are set forth with particularity in the appended claims. This invention itself, however, both as to its organization and method of operation, together with further objects and advantages thereof, may best be understood by reference to the following detailed description taken in connection with the drawings, in which:

In the drawings, like reference numerals represent like or corresponding parts or steps.

DETAILED DESCRIPTION OF THE PREFERRED EMBODIMENTS

Figure 4:
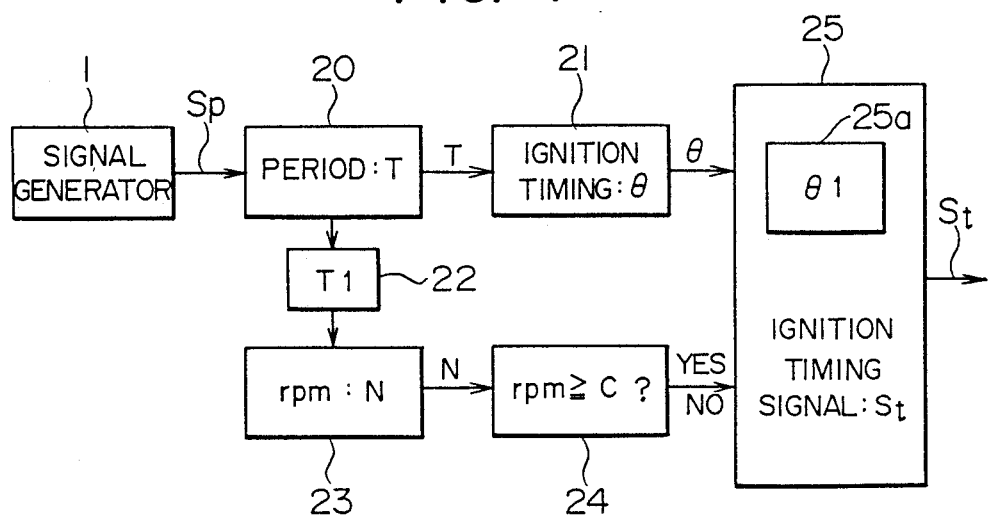
FIG. 4 is a block diagram showing the overall organization of an embodiment of the ignition timing control device according to this invention.
Figure 5:
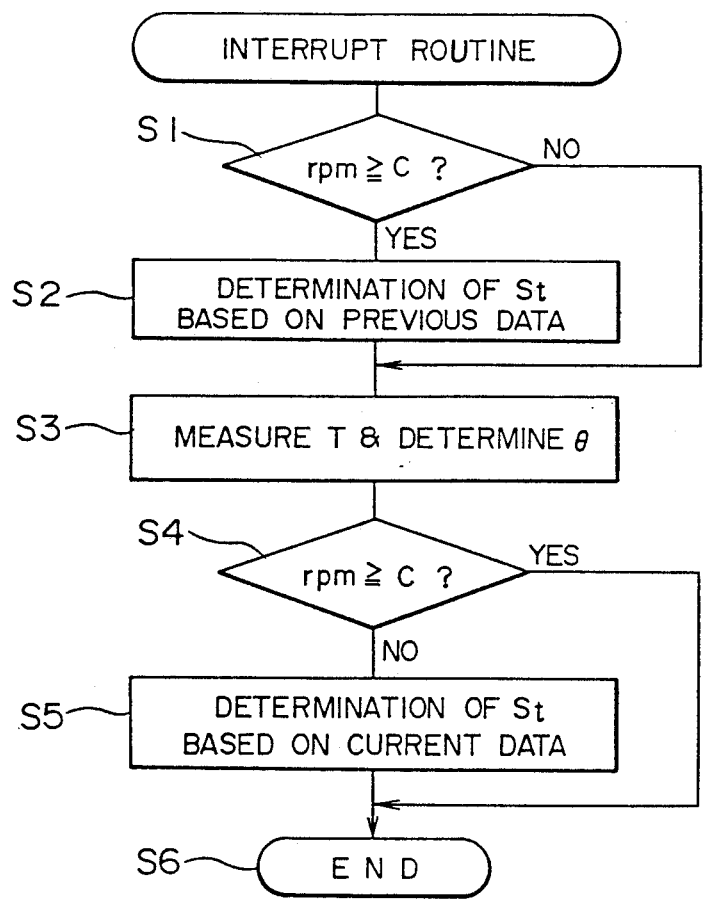
FIG. 5 is a flowchart showing the ignition timing control routine which may be followed in each ignition cycle by the ignition timing control device of FIG. 4.

Referring now to FIGS. 4 and 5 of the drawings, an embodiment of the ignition timing control device according to this invention is described. Let us first describe the overall functional organization of the ignition timing control device referring to FIG. 4; the physical organization of the device is as described above by reference to FIG. 1.

Figure 1:
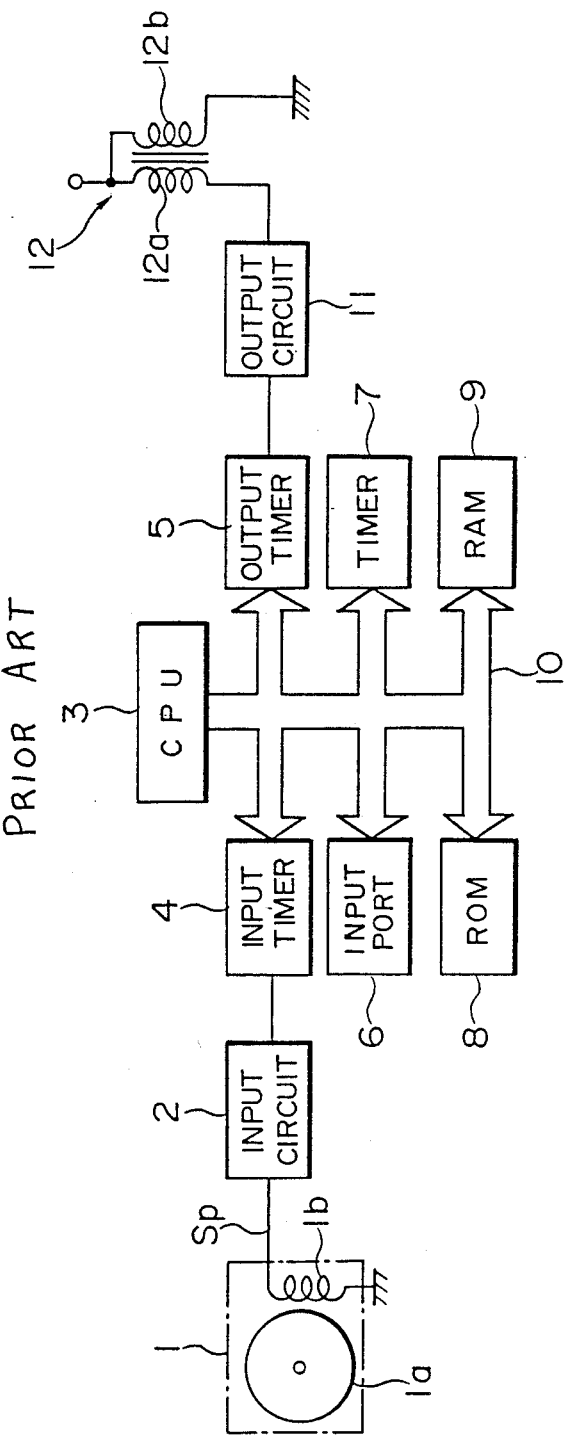
FIG. 1 is a block diagram showing a typical organization of an ignition timing control device for an internal combustion engine utilizing a microcomputer.
Figure 2:
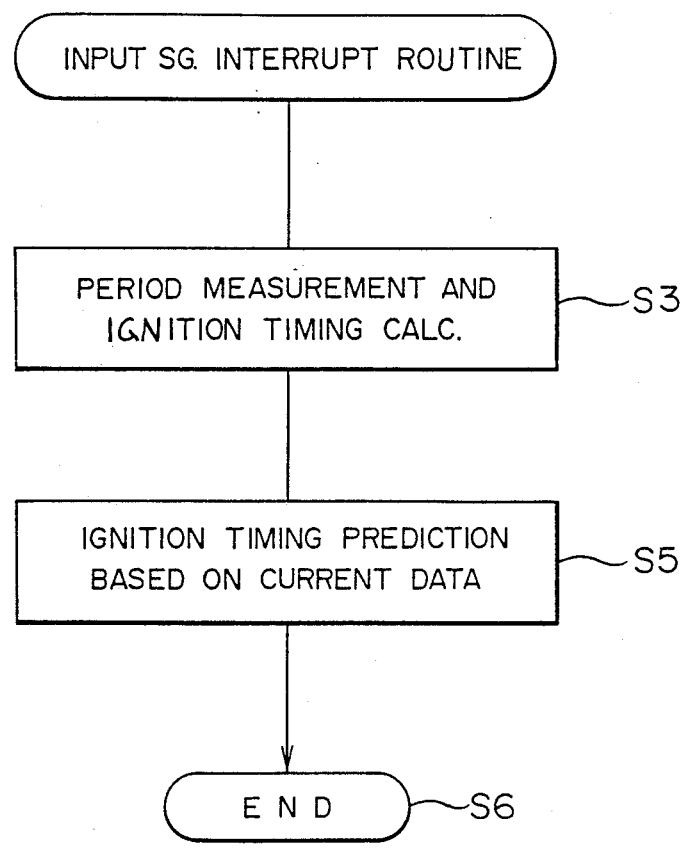
FIG. 2 is a flowchart showing a conventional ignition timing control routine.

The signal generator 1 comprises, as described above by reference to FIG. 1, a rotor 1a and a pickup coil 1b, and generates an angular signal Sp consisting of a pattern of pulses corresponding to the angular positions of the crankshaft of the engine. On the other hand, the means 20 through 25, which are comprised by the microcomputer of FIG. 1, operate as follows in each ignition cycle:

The period determining means 20, comprising the input timer 4 of FIG. 1 coupled to the signal generator 1, receives in each ignition cycle the pulses of the signal Sp, and measures the interval of time or period T between two successive pulses thereof. This period T measured by means 20 corresponds to the rpm of the crankshaft of the engine and is utilized in this embodiment as the rotational speed parameter. Further, in each ignition cycle, the ignition timing determining means 21, coupled to the period determining means 20, determines, upon receiving the current value of T from means 20, the ignition timing (or the ignition angle before top dead center) $\theta$ corresponding thereto, utilizing a table stored in ROM 8. (The table stored in the ROM 8 contains the relationship between the values of the period T and the optimum ignition timing $\theta$ corresponding thereto.) The values of the period T and the ignition timing $\theta$ determined in each ignition cycle by respective means 20 and 21 are stored as the updated values T1 and $\theta$1 thereof in respective memory means 22 and 25a (which are constituted by respective memory locations in the RAM 9). Thus, the values T1 and $\theta$1 stored in the memory means 22 and 25a are updated in each ignition cycle after the completion of the determinations of the period T and of the ignition timing $\theta$, respectively.

On the other hand, the rotational speed determining means 23, coupled to the memory means 22, determines the rpm N of the crankshaft of the engine utilizing the stored value T1 of the period T; this determination of the rpm N is effected at the start of each igntion cycle before the determinations of the period T and ignition timing $\theta$ are performed by respective means 20 and 21 in the current ignition cycle. Thus, the value T1 of the period utilized by means 23 in the calculation of N in the current cycle is the period T determined by means 20 in the immediately preceding ignition cycle. The comparator means 24, coupled to means 23, judges whether the value of N determined by means 23 in the current cycle is above a predetermined level C (inclusive) or not. Consequently, the Yes/No judgement effected by means 24 can be performed before the calculations of period T and ignition timing $\theta$ in the current ignition cycle are performed.

The ignition timing signal St is generated in each ignition cycle by the ignition timing signal generator means 25, coupled to means 21 and 24, in the following manner:

(1) If the judgement by means 24 is in the affirmative (i.e., the rpm N is above the predetermined level C, inclusive), the means 25 sets the output timer 5 so that the ignition timing signal St is generated in accordance with the value $\theta$1 stored in the memory means 25a; this value $\theta$1 of the ignition timing is that calcualted by means 21 in the immediately preceding ignition cycle. Thus, means 25 can generate the ignition timing signal St before the calculations of the period T and the ignition timing $\theta$ by the respective means 20 and 21 are completed in the current ignition cycle.

(2) If the judgement by means 24 is in the negative (i.e., the rpm N is below the predetermined level C), the means 25 waits until the calculations of the period T and the ignition timing $\theta$ in the current ignition cycle effected by means 20 and 21, respectively, are completed; after the value of $\theta$1 stored in the memory means 25a is updated upon receiving the new value of the ignition timing $\theta$ calculated in the current cycle by means 21, means 25 sets the output timer 5 so that the ignition timing signal St is generated in accordance with this new updated value of the ignition timing. Thus, when the rpm of the crankshaft is low, the interval of time between the calculation of the ignition timing $\theta$ and the actual ignition is made sufficiently short to ensure the optimum ignition angle irrespective of the fluctuating variations in the rpm.

The output circuit 11 shown in FIG. 1 turns off the supply of current to the ignition coil 12 in response to the ignition timing signal St, as described above; the operations of the output circuit 11 and the ignition coil 12 are well known in the art and hence a description thereof is not repeated here.

Referring next to FIG. 5 of the drawings, let us describe the operational sequence which may be followed by the ignition timing control device of FIG. 4.

The routine of FIG. 5 is initiated in each ignition cycle by an input signal interrupt. When the routine is started, at the first step S1, the rpm N of the engine is calculated by means 23 on the basis of the period T1 stored in the memory means 22; further, means 24 judges whether the rpm N thus calculated by means 23 is above the predetermined level C (inclusive) or not. When the judgement at step S1 is in the negative (i.e., when the determined rpm N is not above the predetermined level C), the routine proceeds as follows:

The program proceeds from step S1 to step S3 at which the period T is determined by means 20. This determination of the period T is based on the measurement of the period T between the consecutive pulses of the signal Sp received from the signal generator 1 in the current ignition cycle. Further, at the same step S3, the ignition timing (or the degrees BTDC) $\theta$ is determined by means 21 on the basis of the period T which has just been determined by means 20 in the current cycle. The period T and the ignition timing $\theta$ thus determined in the current cycle are stored in the memory means 22 and 25a, respectively, to update the respective values stored therein. Next, at step S4, judgement is made again by means 24 whether the rpm N is above the predetermined level or not. Since the judgement at step S4 must agree with that at step S1 and hence is necessarily negative in this case, the CPU 3 proceeds to step S5 to effect the ignition timing prediction procedure on the basis of the current data; namely, at step S5, the CPU3 effects the ignition timing prediction procedure so that the output timer 5 of means 25 generates the ignition timing signal St in accordance with the ignition timing $\theta$ determined by means 21 at step S3 in the current ignition cycle. At step S6, the routine is concluded.

On the other hand, when the judgement at step S1 is in the affirmative (i.e., when the rpm N is above the predetermined level C), the routine proceeds as follows:

The program proceeds from step S1 to step S2 at which the CPU effects the ignition timing prediction procedure on the basis of the previously determined period data stored in the RAM 9, so that the output timer 5 of means 25 generates at the proper time point the ignition timing signal St in accordance with the value of the ignition timing $\theta$1 stored in the memory means 25a. This value $\theta$1 stored in the memory means 25a is not yet updated in the current ignition cycle, and hence is equal to the value of the ignition timing determined by means 21 in the immediately preceding ignition cycle. Next, at step S3, the period T is measured by means 20, and the ignition timing $\theta$ is determined by means 21 on the basis of the newly calculated value of the period T. The period and the ignition timing thus determined are stored in the memory means 22 and 25a, respectively, to update the stored values therein. Further, at step S4, judgement is made again by means 24 whether the rpm N determined by means 23 is above the predetermined level or not. Since the judgement at step S4 in this case is necessarily in the affirmative, the program proceeds directly to step S6, at which the routine in the current ignition cycle is concluded.

Figure 3:
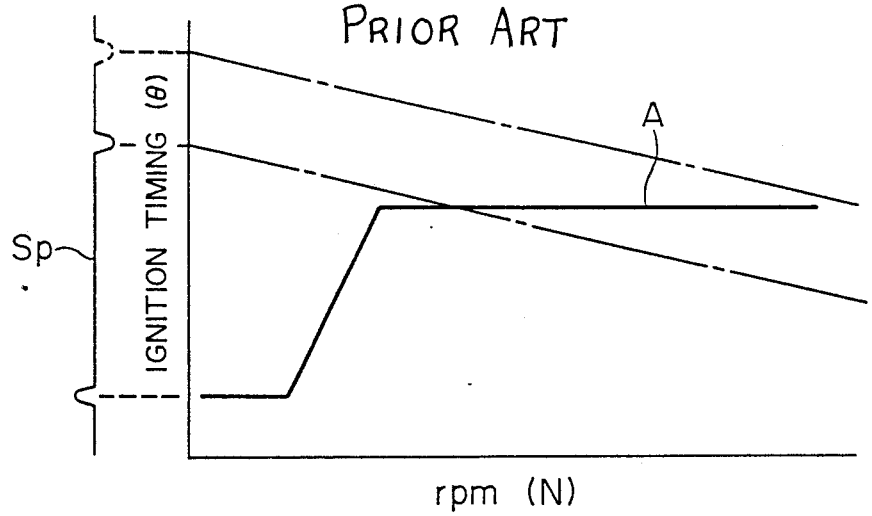
FIG. 3 is a diagram showing the relationship between the rpm of the engine and the ignition timing calculation.
Figure 6:
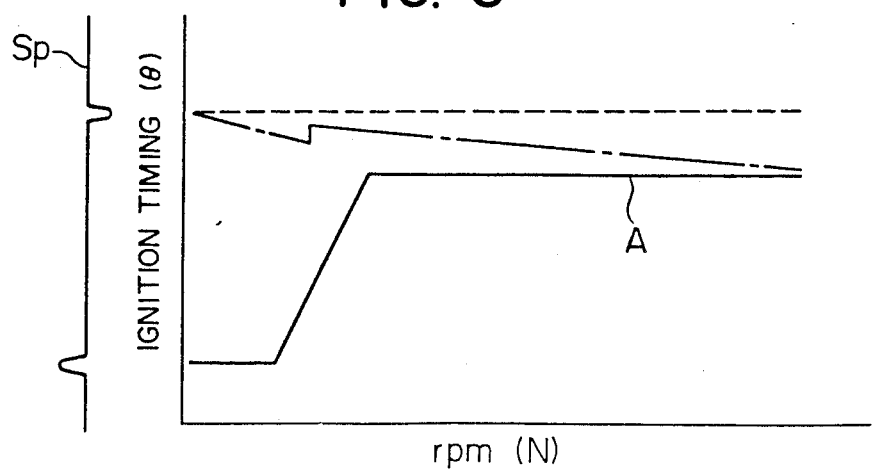
FIG. 6 is a diagram showing the relationship between the rpm of the engine and the calculation of the ignition timing in the case of the control device according to this invention.

FIG. 6 shows the relationship between the rpm N (taken along the abscissa) and the ignition timing $\theta$ (measured in angular degrees taken along the ordinate, with the upward direction pointing to the advance side). As in the case of FIG. 3, the solid line A schematically represents the ignition advance curve. As can be easily understood from the above description, the ignition timing control procedure of FIG. 5 (effected by the control device of FIG. 4 in each ignition cycle for generating ignition timing signal St) can be completed before the proper ignition timing; the completion time of the ignition timing control procedure (as represented by the length of time which passes between the completion of the predictive calculation and the occurence of the reference pulse of Sp shown at the bottom in FIG. 6) is indicated by a dot-and-dash curve in FIG. 6.

While description has been made of the particular embodiment of this invention, it will be understood that many modifications may be made without departing from the spirit thereof; the appended claims are contemplated to cover any such modifications as fall within the true spirit and scope of this invention.

What is claimed is:

1. An ignition timing control device for an internal combustion engine, comprising:

angular signal generator means, operatively coupled to a crankshaft of the internal combustion engine, for generating a signal consisting of a pattern of pulses corresponding to rotational angular positions of the crankshaft;

rotational speed parameter determining means, coupled to said angular signal generator means, for determining a rotational speed parameter corresponding to an interval of time between consecutive pulses of the signal generated by the angular signal generating means, wherein said parameter determining means determines a value of said rotational speed parameter in each ignition cycle of the internal combustion engine by a measurement of the interval of time between the consecutive pulses of the angular signal received from the angular signal generator in the current ignition cycle;

ignition timing determining means, coupled to said rotational speed parameter determining means, for determining in each ignition cycle an ignition timing corresponding to an ignition angle in accordance with said rotational speed parameter determined by the rotational speed parameter determining means in the current ignition cycle;

rotational speed level judgement means, coupled to said rotational speed parameter determining means, for effecting a determination whether a rotational speed of the crankshaft is above a predetermined level or not, wherein said rotational speed level judgement means effects said determination in each ignition cycle by comparing to the predetermined level the rotational speed of the crankshaft which corresponds to the rotational speed parameter that has been determined by the rotational speed parameter determining means in an immediately preceding ignition cycle; and ignition timing signal generator means, coupled to said ignition timing determining means and said rotational speed level judgement means, for generating an ignition timing signal in accordance with an ignition timing determined by said ignition timing determining means, wherein:

in an ignition cycle in which the rotational speed of the crankshaft is determined by said rotational speed level judgement means to be above the predetermined level, said ignition timing signal generator means generates an ignition timing signal in accordance with an ignition timing determined by the ignition timing determining means in an immediately preceding ignition cycle; and in an ignition cycle in which the rotational speed of the crankshaft is determined by said rotational speed level judgement means to be not above the predetermined level, said ignition timing signal generator means generates an ignition timing signal in accordance with an ignition timing determined by the ignition timing determining means in the current ignition cycle.

2. An ignition timing control device as claimed in claim 1, further comprising:

rotational speed parameter storing means, coupled to said rotational speed parameter determining means, for storing said rotational speed parameter determined by said rotational speed parameter determining means, wherein a stored value of said rotational speed parameter is updated in each ignition cycle of the internal combustion engine upon a determination of said rotational speed parameter by the rotational speed parameter determining means; and ignition timing storing means, coupled to said ignition timing determining means, for storing said ignition timing determined by said ignition timing determining means, wherein a stored value of said ignition timing is updated in each ignition cycle of the internal combustion engine upon a determination of said ignition timing by the ignition timing determining means;

wherein said rotational speed level judgement means is coupled to said rotational speed parameter storing means and compares to the predetermined level in each ignition cycle the rotational speed of the crankshaft which corresponds to a value of the rotational speed parameter which is stored in sad rotational speed parameter storing means before being updated in the current ignition cycle; and said ignition timing signal generator means includes said ignition timing storing means and, in an ignition cycle in which the rotational speed is determined by said rotational speed level judgement means to be above the predetermined level, the ignition timing signal generator means generates an ignition timing signal in accordance with a value of the ignition timing which is stored in said ignition timing storing means before being updated in the current ignition cycle.

3. An ignition timing control device as claimed in claim 1 or 2, wherein said rotational speed parameter is the interval of time between two consecutive pulses of the signal generated by the angular signal generator.